(12) United States Patent
Karppanen

(10) Patent No.: US 10,019,249 B1
(45) Date of Patent: Jul. 10, 2018

(54) TECHNIQUES FOR MINIMALLY INVASIVE APPLICATION UPDATES AND DATA TRANSFER

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 554 days.

(21) Appl. No.: 14/576,169

(22) Filed: Dec. 18, 2014

(51) Int. Cl.
  *G06F 9/44* (2018.01)
  *G06F 8/65* (2018.01)
  *H04L 29/08* (2006.01)

(52) U.S. Cl.
  CPC ............. *G06F 8/65* (2013.01); *H04L 67/10* (2013.01)

(58) Field of Classification Search
  CPC .................................. G06F 8/65; H04L 67/10
  USPC .................................................. 717/168–178
  See application file for complete search history.

(56) References Cited

U.S. PATENT DOCUMENTS

| | | | | |
|---|---|---|---|---|
| 5,922,072 A * | 7/1999 | Hutchinson | ............ | G06F 9/4401 713/2 |
| 6,922,724 B1 * | 7/2005 | Freeman | ................. | G06F 9/505 709/223 |
| 7,031,999 B1 * | 4/2006 | Ludwig | ................. | G06Q 10/10 709/202 |
| 7,065,574 B1 * | 6/2006 | Saulpaugh | .............. | G06F 9/465 709/225 |
| 7,555,751 B1 * | 6/2009 | Abbavaram | .............. | G06F 8/67 717/168 |
| 7,882,502 B2 * | 2/2011 | Kovachka-Dimitrova | | G06F 8/65 709/218 |
| 8,250,642 B2 * | 8/2012 | Bartholomy | ............ | H04L 12/66 726/11 |
| 2004/0024808 A1 * | 2/2004 | Taguchi | .............. | H04L 67/1095 709/203 |
| 2006/0090097 A1 * | 4/2006 | Ngan | .................. | G06F 11/1438 714/6.12 |
| 2008/0052344 A1 * | 2/2008 | Alecci | ..................... | H04M 3/12 709/203 |
| 2008/0320466 A1 * | 12/2008 | Dias | ......................... | G06F 8/61 717/171 |
| 2009/0007135 A1 * | 1/2009 | Rathunde | .................. | G06F 8/65 718/107 |

(Continued)

OTHER PUBLICATIONS

Moser, Louise E., et al. "The Eternal system: An architecture for enterprise applications." Enterprise Distributed Object Computing Conference, 1999. EDOC'99. Proceedings. Third International. IEEE, 1999.pp. 214-222.*

(Continued)

*Primary Examiner* — Satish Rampuria
(74) *Attorney, Agent, or Firm* — Davis Wright Tremaine LLP

(57) ABSTRACT

Techniques described and suggested herein include systems and methods for updating applications by reconfiguring an active original application to serve as a proxy for an active replacement application. An original application may be initialized in a way that allows updates to the original application to occur without adversely affecting the operation of the original application. A replacement application may be configured to connect to one or more communication endpoints via the active original application.

20 Claims, 8 Drawing Sheets

(56) References Cited

U.S. PATENT DOCUMENTS

| | | | | |
|---|---|---|---|---|
| 2009/0077478 A1* | 3/2009 | Gillingham | ......... | H04L 41/0803 |
| | | | | 715/763 |
| 2012/0096071 A1* | 4/2012 | Murphey | ................. | G06F 8/63 |
| | | | | 709/203 |
| 2012/0198269 A1* | 8/2012 | Gupta | ................. | G06F 11/1438 |
| | | | | 714/4.11 |
| 2012/0233123 A1* | 9/2012 | Shisheng | .............. | G06F 11/004 |
| | | | | 707/639 |
| 2013/0036237 A1* | 2/2013 | Mutisya | .............. | G06F 11/1433 |
| | | | | 709/238 |

OTHER PUBLICATIONS

Tewksbury, Lauren A., Louise E. Moser, and Peter M. Melliar-Smith. "Live upgrades of CORBA applications using object replication." Proceedings of the IEEE International Conference on Software Maintenance (ICSM'01). IEEE Computer Society, 2001. pp. 1-10.*

Neamtiu, Iulian, and Tudor Dumitras. "Cloud software upgrades: Challenges and opportunities." Maintenance and Evolution of Service-Oriented and Cloud-Based Systems (MESOCA), 2011 International Workshop on the. IEEE, 2011.pp. 1-10.*

* cited by examiner

TECHNIQUES FOR MINIMALLY INVASIVE APPLICATION UPDATES AND DATA TRANSFER

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as need and depending on their needs.

However, as the demand for network computing and storage has increased, the frequency and urgency of updating, testing, and migrating online applications has also increased. Interruptions in services, such as network computing and storage services, provided therefrom may be disruptive to customers of those services. As the number of customers reliant on the services increases, service interruptions from updates to underlying online applications may cause adverse experiences for a larger number of customers than if such services were only provided locally.

BRIEF DESCRIPTION OF THE DRAWINGS

Various embodiments in accordance with the present disclosure will be described with reference to the drawings, in which.

DETAILED DESCRIPTION

Figure 1:
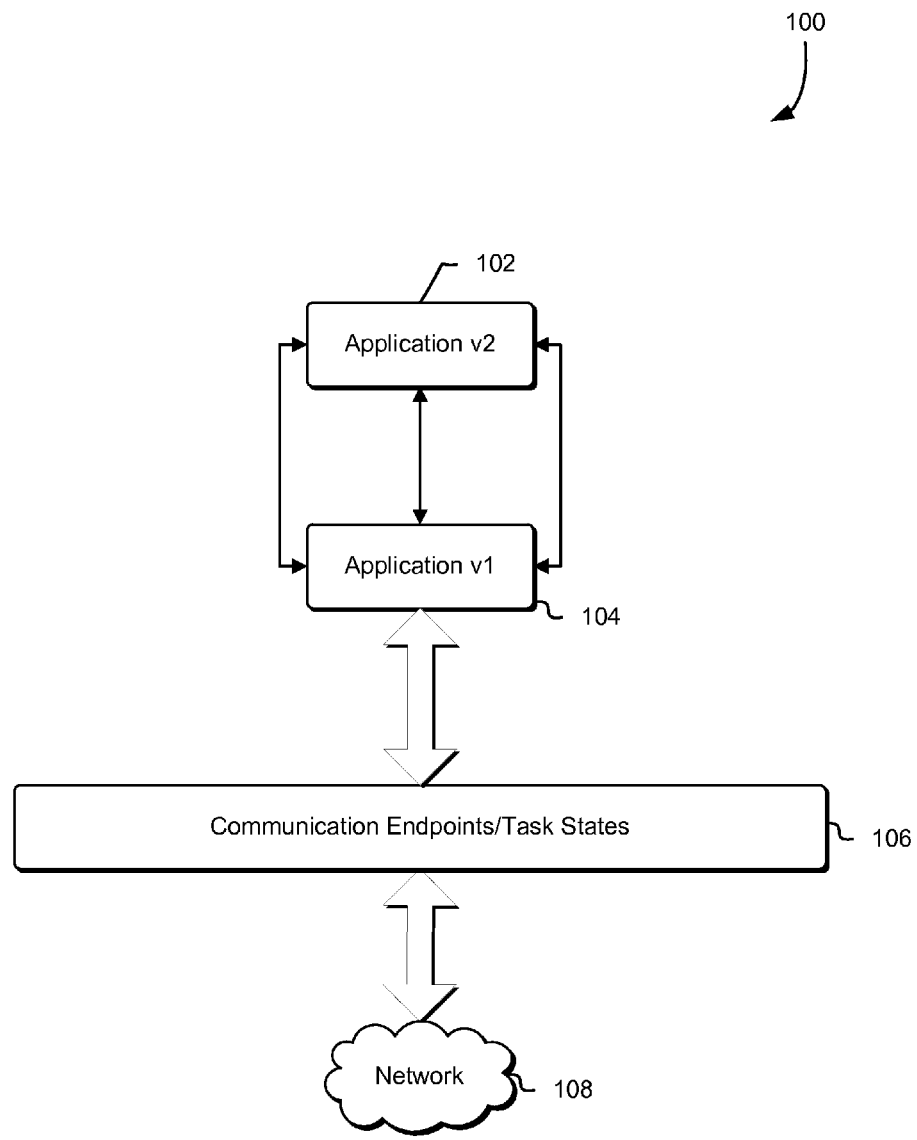
FIG. 1 schematically illustrates example workflows for updating or replacing an application that is connected to one or more communication endpoints, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for updating applications by reconfiguring an active original application to serve as a proxy for an active replacement application. An original application may be initialized in a way that allows updates to the original application to occur without adversely affecting the operation of the original application. For example, a binary of the original application may be copied, and that copy may perform the intended functions, while the location from which the original application binary was copied may be monitored by a listener for changes to the original application binary, e.g., updates.

If the listener detects such a change, the system may orchestrate a number of events to transition various functions from the active original application to the replacement application. For example, an orchestrator entity may receive the update notification and cause the replacement application to be copied to an "active" location, in a similar fashion as the original application. Prior to transferring, e.g., state information and/or responsibility for communication with the communication endpoints presently being held open and/or used by the active original application, such communication may be suspended and any further requests related to the communication endpoints involved may be held, e.g., in a buffer, while the transition is being orchestrated.

The respective active original application and active replacement application may be configured, such as by an orchestrator entity, in a fashion that facilitates the transition. For example, various aspects of the state of communication or execution (e.g., task state of the active original application) between the active original application and the communication endpoints at the time of communication suspension may be provided to the active replacement application, so as to facilitate, after resumption of communication, further servicing of any requests in flight at the time of suspension. The active original application may be configured to serve as a proxy for the communication endpoints used and/or open at the time the transition was initiated, and the active replacement application may be configured to interface with the active original application for access to those communication endpoints. Thereafter, processing of requests related to the communication endpoints may resume, and the requests related to those communication endpoints that were held in the buffer during the transition process may be processed in due course.

Thereafter, the active replacement application may service new connections with, e.g., other communication endpoints, directly and without the interceding active original application. To the extent that connections between the active original application and any of the communication endpoints break or become unusable, any reconnections are performed such that the active replacement application communicates directly with those communication endpoints, rather than with the active original application. In some embodiments, the active original application is terminated (or allowed to expire) once no communication endpoints are held open by the active original application (e.g., every prior-held communication endpoint has been reconnected, whether intentionally or organically, with the active replacement application), and/or if the original task(s) associated with the task state of the active original application as provided to the active replacement application have been completed by the active original application, or otherwise terminated.

The techniques described herein are usable in a variety of scenarios, including updates to existing applications, replacement of hardware (in which the replacement hardware is running the same or related application as the original hardware), testing of changes to existing applications, and the like. It is contemplated that in scenarios where the replacement application fails in some aspect during the transition process, the system (e.g., through an orchestrator entity) may revert some or all of the transition actions so as to restore the functionality of the original application.

FIG. 1 schematically illustrates example workflows for updating or replacing an application that is connected to one or more communication endpoints, in accordance with some embodiments. An replacement application 102, illustratively labeled as "Application v2" in FIG. 1, interfaces with an original application 104, illustrative labeled as "Application v1" in FIG. 1, so as to communicate with communication endpoints 106 facing a network 108. Both the replacement application 102 and the original application 104 may be any application capable of being executed on the system and communicating with the communication endpoints. For example, the replacement application 102 and the original application 104 may be standalone applications, network applications, runtime-dependent applications, scripts, and the like.

The replacement application 102 and the original application 104 may run on any computing system, and on any quantity of computing systems, capable of executing the respective applications. For example, such computing systems may be physical computing system such as servers, workstations, laptops, handheld devices such as smartphones and tablets, and the like. As another example, the computing systems may be virtual computing systems, such as virtual computing systems implemented using one or more resources of a computing resource service provider, such as that described in further detail herein.

The replacement application 102 and/or the original application 104 may be made available for use and/or manipulation via, e.g., one or more services provided as provided by the implementing computing system(s), or computing system(s) associated with the implementing computing system(s). As an example, an implementing computing resource service provider may provide programmatic access the original application 104 and/or the replacement application 102 to, e.g., customers of the implementing computing resource service provider, via one or more services (such as web services), provided by that computing resource service provider. The customers may access the service, and therefore the original application 104, via programmatic methods (e.g., via one or more application programming interface(s) and related calls, and/or web service calls), user interface(s) (such as those provided by an implementing computing resource service provider), or some combination of the two.

Access by, e.g., customers of a computing resource service provider, to the replacement application 102 and/or the original application 104, may be made via one or more communication endpoints 106 exposed to the network 108. The communication endpoints may be any endpoints that provide for data flow and/or and interface(s) for such data flow between entities on the network 108 and the replacement application 102 and/or the original application 104. For example, the communication endpoints may be sockets, such as datagram sockets, stream sockets, raw sockets, and the like, which may include network sockets and/or Internet sockets. The communication endpoints 106 may be paired with other endpoints, such as those at the customer end (e.g., socket pairs). In some embodiments, the communication endpoints 106 may be provided directly by the replacement application 102 and/or the original application 104. In some embodiments, the communication endpoints 106 may be provided by one or more resources of the implementing computing system, such as a computing resource service provider.

The network 108 may be any appropriate network for the particular implementation. For example, the network 108 may be the Internet, an intranet, a local area network, a wide area network, a wireless network such as a cellular voice or data network, and the like. The network 108 may use one or more appropriate protocols for communication between entities connecting to network 108 (such as customers of a computing resource service provider) and one or more communication endpoints 106. Such protocols may include routing protocols (including Intermediate System to Intermediate System, Open Shortest Path First, Interior Gateway Routing Protocol, Enhanced Interior Gateway Routing Protocol, Exterior Gateway Protocol, Border Gateway Protocol), routed protocols (including Internet Protocol and Internetwork Packet Exchange), protocols of the Internet Protocol suite (such as User Datagram Protocol and Transmission Control Protocol), application layer protocols (such as Hypertext Transfer Protocol, Internet Message Access Protocol, Secure Shell) cryptographic protocols (such as Transport Layer Security and Secure Sockets Layer), and the like. The communication endpoints 106 and/or one or more of the associated protocols may be implemented in hardware, software, or some combination of the two. Software implementations of various protocols may be of any appropriate type, and may include Bird Internet routing daemon, Quagga, GNU Zebra, OpenBGPD, OpenOSPFD, and XORP.

Both the replacement application 102 and the original application 104 may differ, relative to each other, in terms of implementation and/or overall functionality. For example, the replacement application 102 may be a different version of the original application 104 (such as an updated version, e.g., to patch bugs or security vulnerabilities). As another example, the replacement application 102 may the same as the original application 104, but running on a different computing system (e.g., such as may be the case if the computing system running the original application 104 is showing signs of present or impending failure, and the replacement application 102 is running on a replacement computing system). As yet another example, the replacement application 102 may be fundamentally different than the original application 104, such as if the replacement application 102 uses different interfaces and/or protocols than the original application 104.

In the case that the replacement application 102 is a different version of the original application 104, the replacement application 102 may be a test version of the original application 104. In this case, the techniques described may be used to revert back to the original application 104 if the replacement (test) application 102 does not function as intended.

In the case that the replacement application 102 is the same as the original application 104 but differs in environment (e.g., the computing system(s) running the respective applications 102, 104 differ), either the replacement application 102 or the original application 104 may be run (or intended to run) on a virtual computing system and the other may be run (or intended to run) on a physical computing system, such as would be the case of a migration of the functionality of the application from a physical computing system to a virtual computing system, or vice versa.

The original application 104 may have handles on one or more of the communication endpoints 106 or be in one or more task states 106 relating to executing tasks, and in some cases, there may be data flow in process between entities on the network 108 and the original application 104 via the communication endpoints 106 at the time the replacement application 102 is provided to replace the original application 104. The techniques described in further detail herein may provide for uninterrupted or minimally interrupted service provided in connection with the original application 104, such as to the entities on the network 108 connecting thereto, or as another example, so as to execute tasks without interruption.

The task states 106 may be any reflection or accounting of one or more states, e.g., execution and/or processing states, of a given application at a given point in time. For example, a task state 106 may include running processes, open connections (such as to communication endpoints 106), data processing, and the like. In some embodiments, the task state 106 may include information regarding the execution and/or connection state of an original application 104, and additionally may include information regarding one or more processes of the original application 104 that is to run to completion by the original application 104 regardless of the transition and/or processing state of a replacement application 102.

In some embodiments, the replacement application 102 is configured, using techniques described in further detail herein, to interface with the original application 104 such that the original application 104 acts as a proxy for data flow between the replacement application 102 and the communication endpoints/task states 106 and/or with respect to one or more task states 106. The original application 104 may be configured so as to suspend processing of requests related to the functionality of the original application 104, and to pass such requests for the communication endpoints and/or task states to which it has a handle or other responsibility at the time of replacement by the replacement application 102, to replacement application 102 for processing thereafter. In some embodiments where the replacement application 102 and the original application 104 have access to the same physical memory, one or more classes that manage the communication endpoints may be implemented using shared memory buffers for incoming data. In such embodiments, the original application 104, which may be acting as a proxy, may pass the incoming data to the replacement application 102 without copying the data, e.g., by allowing the replacement application 102 to reopen the same shared memory with respect to the incoming data. In such embodiments, notifications regarding the incoming data may be handled by events and actions directly between the replacement application 102 and the original application 104.

The transition from original application 104 to replacement application 102 (and in some embodiments, vice versa) may be made in an uninterrupted or minimally interrupted fashion by the techniques described herein, which allow for transition of data flow with the communication endpoints (or with respect to the task states) to occur without necessitating closing connections with and/or handles held by the original application 104 to the communication endpoints 106 involved. As described in further detail herein, the replacement application 102 may directly connect with entities on the network 108 for other communication endpoints for which the original application 104 does not, or no longer hold a handle (or, as another example, a given task state 106 for which the original application 104 no longer has responsibility). Also as described in further detail herein, any connections and/or handles held by the original application 104 (while the replacement application is connected to the original application 104) that terminate may be directed to the replacement application 102 upon the reconnection, such that the original application 104 acts as a proxy for increasingly fewer communication endpoints 106 over time. At a time after the original application 104 no longer has any active handles or connections with the communication endpoints 106, the implementing system may, in some embodiments, terminate the original application 104 and/or any process(es) related thereto.

Figure 2:
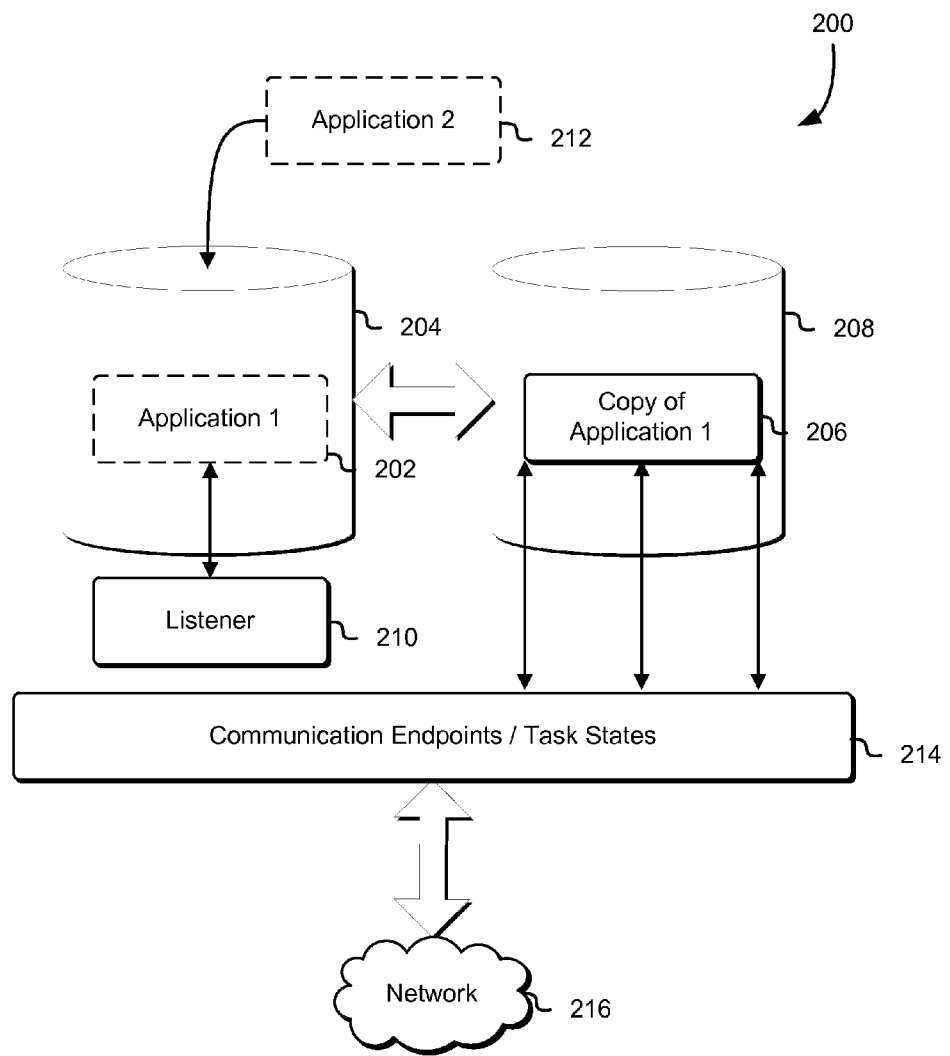
FIG. 2 schematically illustrates example workflows for detecting changes to an active application, in accordance with some embodiments.

FIG. 2 schematically illustrates example workflows for detecting changes to an active application, in accordance with some embodiments. A binary of an original application 202 is stored at a first location 204, such as a data store connected to a computing system. The binary may be an executable binary, a dependency of an executable, or the like. The original application may be similar to the original application described herein in connection with at least FIG. 1.

The original application maybe initialized such that the binary of the original application 202 is copied 206 to a second location 208. The second location 208 may be a different location than the first location 204 on the same data store, on a different data store of the same computing system, or on a different computing system. As previously discussed, the disparate computing systems may both be physical, virtual, or a combination of physical and virtual (e.g., the original application binary 202 may reside on one type while the copy 206 resides on another type).

The copy of the original application 206 at the second location 208 is used, by the implementing computing system, as the active binary for the original application. The copy of the original application 206 may therefore be executed by the implementing computing system, and communicate with the network 216 via one or more communication endpoints 214. The communication endpoints 214 and the network 216 may be similar to analogous features described at least in connection with FIG. 1 above, and the copy of the original application 206 may communicate with and/or hold handles to/be responsible for one or more of the communication endpoints and/or task states 214 in a similar fashion as described in connection with FIG. 1 above.

A listener entity 210 polls the first location 204 for changes to the data at the first location 204, or, in some embodiments, may be notified that the original application at the first location 204 is to be replaced or superseded in advance of the replacement taking place (e.g., if new hardware running the original application is intended to replace the original hardware). The listener entity 210 may be any hardware or software resource that is capable of polling for data changes or events related to such changes. For example, the listener entity 210 may be a resource of an implementing computing system or an associated computing resource service provider. Although the listener entity 210 is illustrated as separate from the first location 204, in some embodiments, the listener entity 210 may be a component or resource of the first location. In some embodiments, the listener entity 210 may in fact be a functionality of the original application 202.

For example, the listener entity 210 may detect that a binary of a replacement application 212 has replaced the binary of the original application 202. As another example, the listener entity 210 may detect that the binary of the original application 202 has been modified with updated functionality or code. In the case that the listener entity 210 detects that the binary of the original application 202 at the first location 204 has been updated, replaced, or superseded, the listener may initiate one or more techniques described in further detail herein to hand over connections and/or handles to the one or more communication endpoints 214 to the replacement application 212. The communication endpoints and/or task states 214 and the network 216 may be similar to, or have similar characteristics to, the communication endpoints/task states and network described in connection with at least FIG. 1 above.

Figure 3:
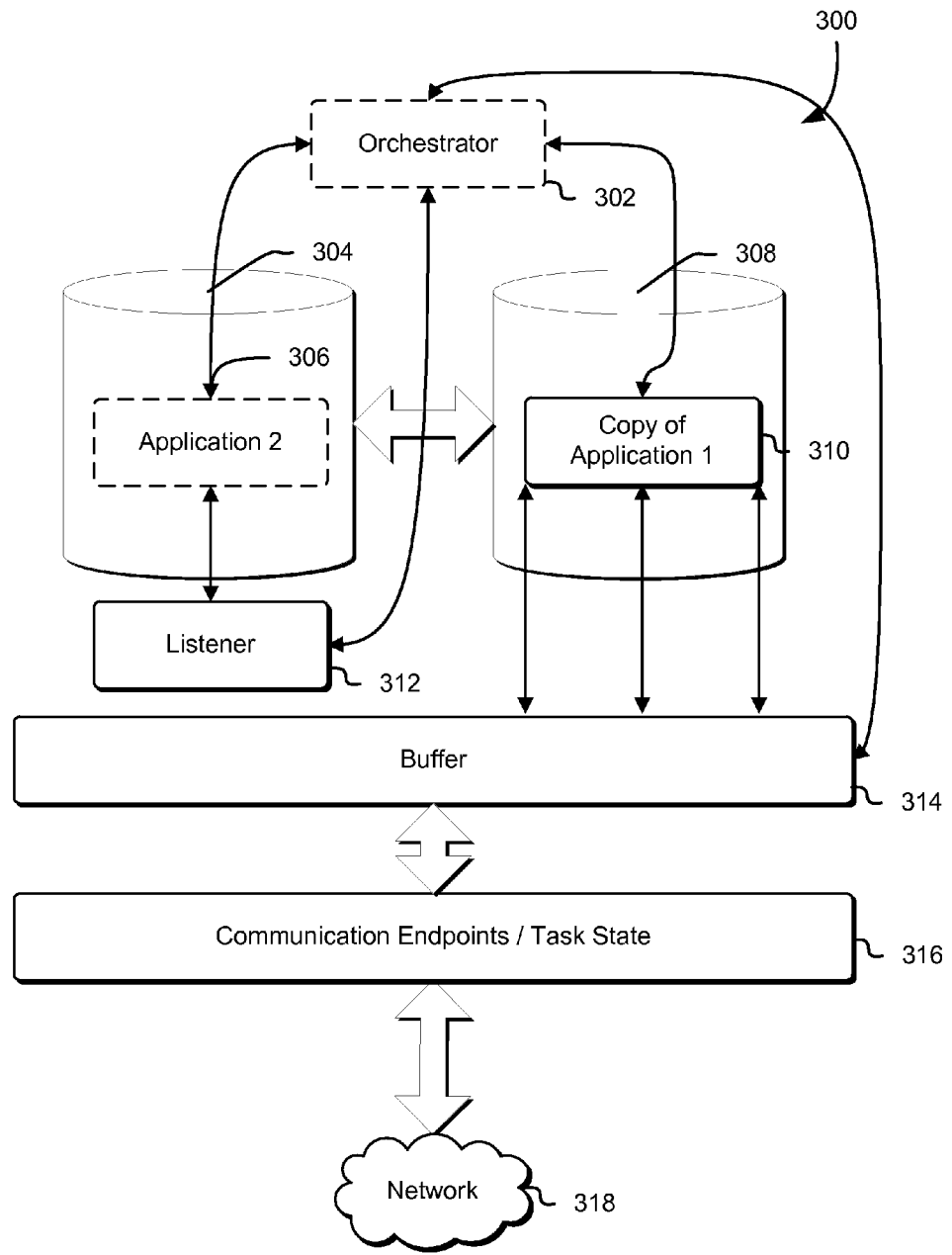
FIG. 3 schematically illustrates example workflows for orchestrating a handover, to an updated application, of communications between an active application and communication endpoints, in accordance with some embodiments.

FIG. 3 schematically illustrates example workflows for orchestrating a handover, to an updated application, of communications between an active application and communication endpoints and/or associated task states, in accordance with some embodiments. An orchestrator entity 302 may interact with various components so as to coordinate and/or initiate various techniques to effect a transition, such as an update, of an active original application 310 executing at a first location 308 with a replacement application 306 associated with a second location 304. As previously discussed, the first location 308 and the second location 304 may be different locations on the same data store, on different data stores of the same computing system, or on different computing systems.

A listener entity 312, such as the listener entity 210 described above in connection with FIG. 2, notifies the orchestrator entity 302 that a replacement application 306 is to replace or supersede the active original application 310. The orchestrator entity 302 may be any component(s) or resource(s) of the implementing computing system or associated computing resource service provider. As with the listener 312, while the orchestrator entity 302 is shown separately from either of locations 304, 308 and/or the listener entity 312, it is contemplated that the functionality of the orchestrator entity 302 may be integrated into any of the resource(s) implementing either of the locations 304, 308, the listener entity 312, or some combination thereof.

At a time after receiving the aforementioned notification, the orchestrator entity 302 may cause (such as by notification) the active original application 310 to suspend its activities relative to the communication endpoints and/or tasks associated with task states 316. The orchestrator entity 302 may capture, or cause the active original application 310, to capture the state (or portion thereof) of the active original application 310, such as with relation to the communication endpoints 316 and/or task states 316. For example, the captured state may include information identifying the communication endpoints 316 to which the active original application 310 has handles, the current state of pending requests that the active original application 310 was in the midst of servicing at the time the orchestrator entity 302 caused the active original application 310 to suspend its activities, and the like.

The orchestrator entity may also cause the implementing computing system to suspend the processing of any incoming requests related to, or via, the communication endpoints 316 and/or task states 316, such as those received via network 318, that the active original application 310 was in communication with or to which the active original application 310 held handles at the time of suspension. While the transition orchestrated by the orchestrator entity 302 is taking place, further such incoming requests may be held, such as in a queue or other holding pattern, in one or more buffers 314. The buffers may be any resource, or collection of resources, capable of storing incoming requests for a sufficient length of time such that the requests are not lost while the transition is taking place. The one or more buffers 314 may, in some embodiments, be the same entities that queue incoming data during normal operation of an application. In some of such embodiments, the communication endpoints 314 may continue to receive incoming data but may stop notifying the active original application 310 of such incoming data (and/or may stop delivering such data to the active original application 310).

In some embodiments, the orchestrator entity 302 may configure the active original application 310 to act as a proxy for entities connecting thereto, with regard to the communication endpoints 316 to which it has connections and/or handles. The orchestrator entity 302 may further configure the active original application 310 to transfer the captured state (or portion thereof) to the replacement application 306. In some embodiments where the orchestrator entity itself captures the state, the orchestrator entity 302 may accordingly itself transfer information regarding the captured state to the replacement application.

In embodiments where a replacement application 306 replaces another active replacement application for an active original application, the orchestrator may suspend the original active application using the techniques described and migrate ownership of, e.g., shared memory and/or incoming data to the active replacement application, rather than having multiple replacement applications serve as proxies.

In some embodiments, the orchestrator entity 302 configures the replacement application 306 (or a copy thereof, such as may be the case if the copying techniques described in connection with FIG. 1 are applied to the replacement application 306) to interface with the active original application 310 to access the communication endpoints to which the active original application 310 holds handles and/or connections. For example, the active original application may provide, either itself or via the orchestrator entity 302, duplicate communication endpoints that correspond with the communication endpoints to which it holds handles, to the replacement application 306 so as to minimize the amount of configuration necessary for the replacement application 306.

Thereafter, the orchestrator entity 302 may configure the replacement application 306 to serve as the active application, e.g., to process requests and data related to the communication endpoints and/or task states 316 to which the active original application holds handles, connections, and/or responsibilities. For example, the replacement application 306 may process new tasks or tasks related to a task state 316 transferred thereto, while the active original application processes data and/or retains responsibility for a subset of such tasks that may require the active original application to complete. Thereafter, the orchestrator entity 302 may cause the appropriate resource(s) of the implementing computing system(s) to resume flow of data and/or requests from the network 318, for access to and/or processing by the active replacement application 306 (by way of the active original application 310, at least with respect to the communication endpoints 316 to which the active original application 310 retains handles and/or connections). In some embodiments, the requests and/or data cached during the transition process, such as by the buffer 314, may be processed by the active replacement application 306, at a time and in a fashion determined by any appropriate resource(s) of the implementing computing system.

For example, the orchestrator entity 302 may cause the buffer to provide the cached requests and data for processing to the active replacement application 306 prior to any new requests and/or data received after resumption of service. As another example, the buffer 314 may be implemented so as to always cache and/or queue requests and/or data, regardless of service state, and the buffered requests and/or data may be processed by the active replacement application 306 in an order of its own choosing without further intervention from the orchestrator entity 302. In some embodiments, pending actions captured state of the active original application, after being transferred to the active replacement application 306, may be acted on by the active replacement application 306 in a manner analogous to that which the active original application would have processed such actions had the transition not taken place.

An example workflow for migrating a given communication endpoint (e.g., transferring state associated therewith) may begin with suspending delivery of data incoming to the communication endpoint to, e.g., listeners associated with the active original application, while keeping the buffers (e.g., shared memory) active so as to keep the incoming data flow uninterrupted. One or more aspects of the incoming data and/or the connecting peer sending the data may be serialized with, e.g., offsets representing receive buffers. Such aspects may include an address and/or port associated with the incoming data and/or the connecting peer, security context, statistics and/or metrics, and/or an identifier for some or all of the shared memory correlated therewith. The serialized aspects may be associated with an identifier that indicates the content type of the associated incoming data. An object corresponding to the serialized aspects and/or the content type identifier may be created in the replacement application, but with respect to any connection endpoints with which the replacement application communicates, objects may be created that map input buffers of the replacement application with various locations in the shared memory, rather than, e.g., a network layer implementation of a host's operating system.

In some embodiments, the techniques described herein may be used to transfer, e.g., task state and/or responsibility for communication endpoints to a new instance of the same original application (e.g., in cases where instability, memory leaks, or other defects associated with a given instance of the original application would be resolved by terminating the old instance), so as to handle incoming data with little or no interruption.

Figure 4:
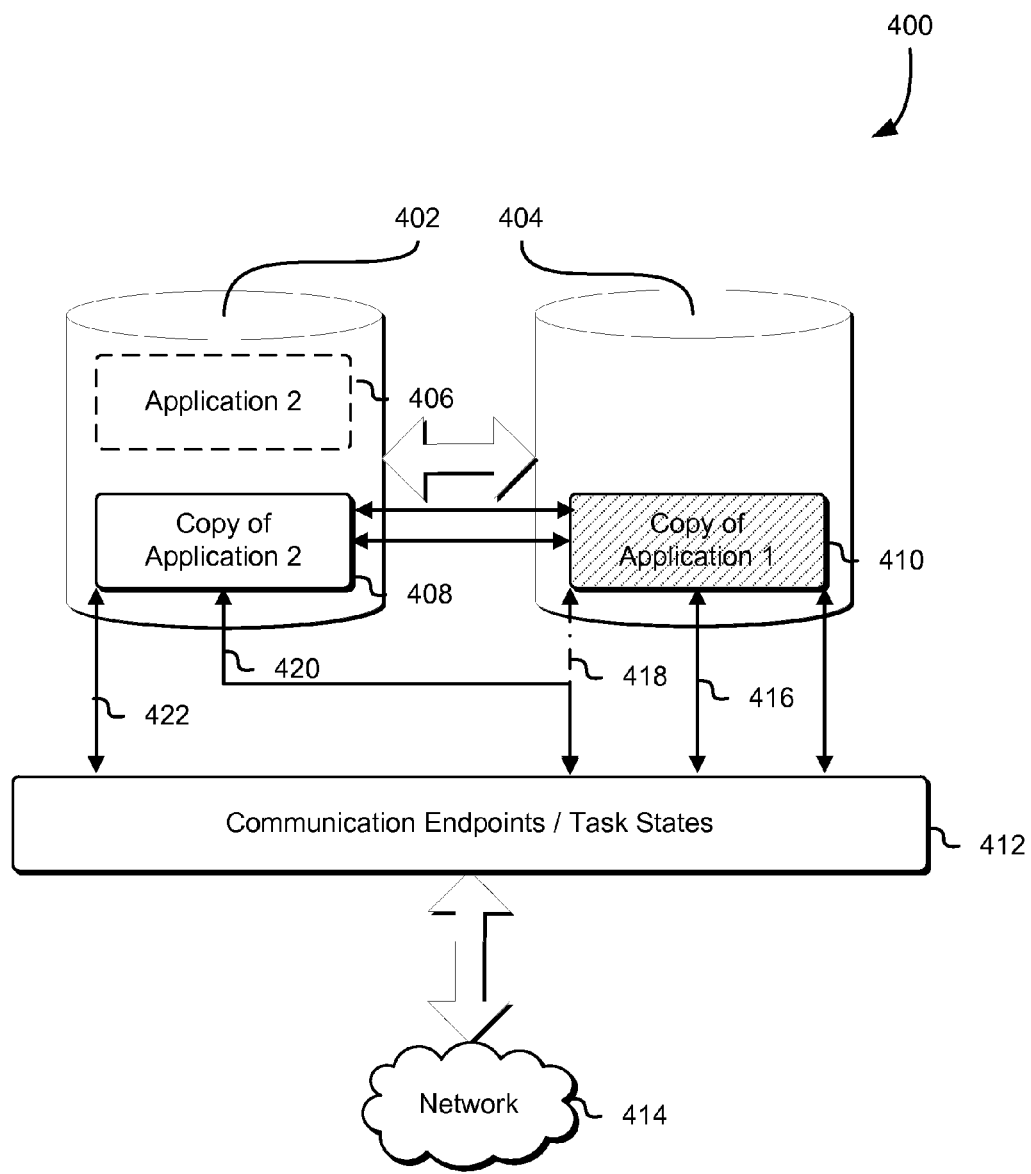
FIG. 4 schematically illustrates example workflows for using an active original application as a proxy for connections, by an active replacement application, to communication endpoints, in accordance with some embodiments.

FIG. 4 schematically illustrates example workflows for using an active original application as a proxy for connections, by an active replacement application, to communication endpoints, in accordance with some embodiments. Various locations 402, 404 connected with one or more computing systems store an active original application 410, an active replacement application 408, and a current binary corresponding to the presently active application 406, in accordance with the techniques described in connection with at least FIGS. 1 through 3 above. For example, the active replacement application 408 may have been copied from the current binary 406, which may be at a location that is monitored for changes and/or notifications that the current binary 406 is being superseded (e.g., as described in connection with FIGS. 1 and 2 above).

Similarly to discussed in connection with at least FIG. 3 above, an active replacement application 408 may be configured to interface with an active original application 410 to communicate with a set of communication endpoints 412, to which the active original application 410 has handles and/or open connections. To the extent that connections between entities on the network 414 via a given communication endpoint and/or task state 412 with the active original application 410 remain active 416, the active original application 410 continues to act as a proxy for that communication endpoint and/or task state 412. As may be contemplated, in some embodiments, so long as handles remain held by the active original application 410 to at least one communication endpoint and/or task state 412, the active original application 410 may remain active, at least with regard to its proxying functions, and processes associated therewith may not necessarily be terminated by, e.g., the implementing computing system.

In some embodiments, if, for a given communication endpoint and/or task state 412, an associated connection or handle is terminated (e.g., by adverse network conditions, termination of a remote entity on network 414, or the like), upon a request for reconnection or a new connection/task associated for that communication endpoint and/or task state 412, such request and/or reconnection is directed 420, such as by an orchestrator entity as discussed above in connection with FIG. 3, to the active replacement application 408 rather than to the active original application 410. Therefore, in some embodiments, it will be contemplated that the number of handles and/or connections held by the active original application 410 to the communication endpoints 412 may decrease over time, as in such embodiments, no new connections are being made with the active original application 410 (and are instead directed to the active replacement application 408).

Similarly, in some embodiments, new connections involving communication endpoints 412 to which the active original application 410 does not have an existing handle or connection, are directed, such as by an orchestrator entity as discussed above in connection with FIG. 3, to the active replacement application 408. As updates to the application may occur faster than, e.g., connections to the active original application 410 are terminated and reconnected with the active replacement application 408, it may be contemplated that multiple (e.g., more than the two illustrated herein) versions or applications may interact so as to connect with the communication endpoints 412. In some embodiments, an implementing computing system may, at an appropriate time determined based on factors such as network load, available computing capacity, and quantity of clients connecting to the communication endpoints, forcibly terminate connections associated with one or more of the active applications so as to consolidate and/or reduce the number of active applications responsible for communication with the communication endpoints 412. In some embodiments, at a time after determining (e.g., by an orchestrator entity, listener entity, or other process and/or resource(s) of an implementing computing system) that a given active original application no longer holds handles to any communication endpoints (and may therefore be considered an orphan application), the active original application, or processes associated therewith, may be automatically terminated, and in certain embodiments, the binary copy of such an terminated application may be removed from the location at which it is stored.

In some embodiments, prior to and/or in connection with terminating the active original application 410, an entity, such as a name server or domain name system (DNS) server, may be notified so as to update records regarding the presently active and/or or responsible application (e.g., the active replacement application 408. For example, users connecting to a given system implementing the active replacement application 408 may be directed to the active replacement application 408 by the entity after such notification so as to reduce or eliminate the requests traversing the system to the active original application 410.

Figure 5:
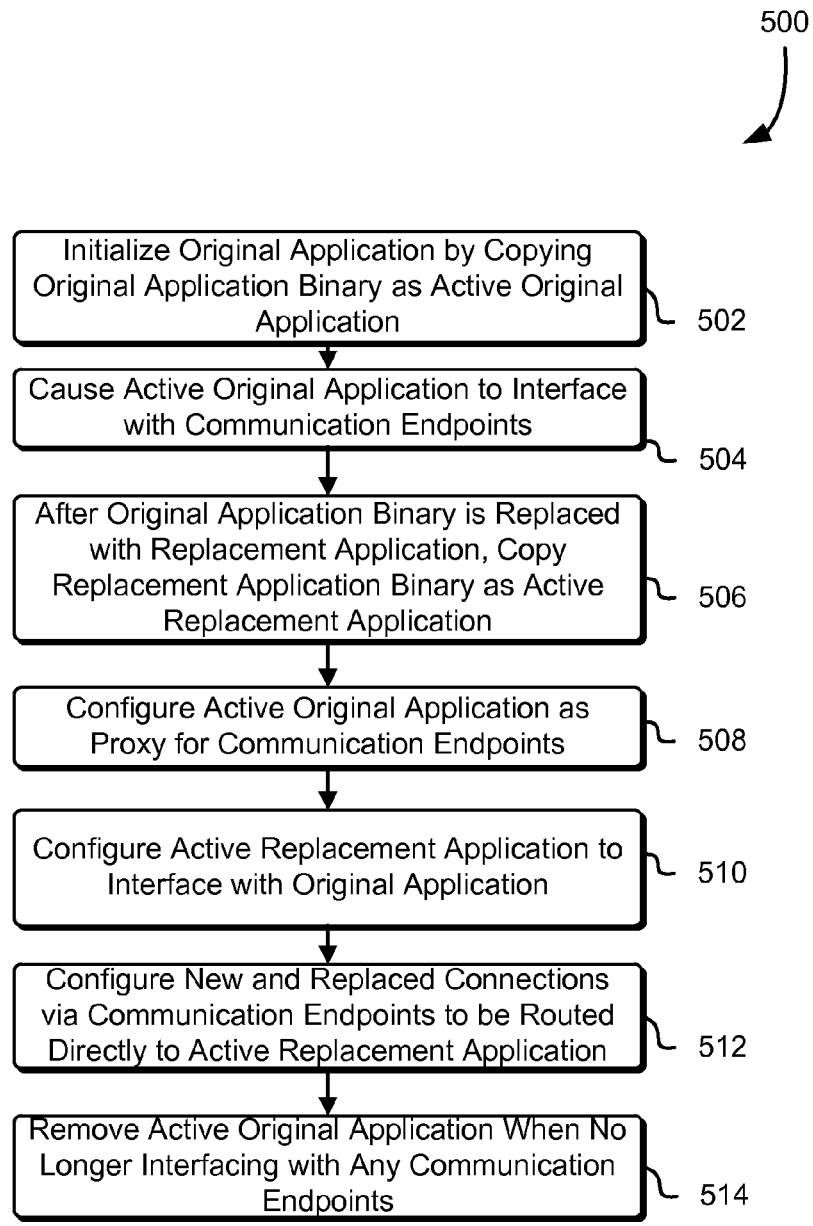
FIG. 5 schematically illustrates an example process for replacing an active original application with an active replacement application in accordance with some embodiments.

FIG. 5 schematically illustrates an example process for replacing an active original application with an active replacement application in accordance with some embodiments. At step 502, an original application is initialized, such as by a resource of an implementing computing system as described above in connection with at least FIG. 1, at least by copying a binary associated with the original application to a location from which the copy will be executed, e.g., by the computing system, so as to provide the functionality thereof.

At step 504, the copy of the original application is activated, such as by execution by the associated computing system, so as to process data and requests associated with one or more communication endpoints of the computing system, such as described above in connection with at least FIGS. 1-4.

At step 506, at a time after determining that the original application's binary has been replaced and/or superseded (such as by notification to and/or determination by a listener entity, described above in connection with at least FIGS. 1 and 2), the replacement application's binary may be copied to an active location in a similar fashion as described in connection with step 502 above.

At step 508, the active original application is configured, such as by an orchestrator entity described above in connection with at least FIG. 3, to serve as a proxy for the communication endpoints to which is has a handle, in connection with the time at which step 506 takes place.

At step 510, the active replacement application is configured, such as by an orchestrator entity described above in connection with at least FIG. 3, to interface with the active original application as configured in step 508 so as to access the communication endpoints to which it has a handle.

At step 512, an orchestrator entity or other resource(s) of an implementing computing system may direct and/or configure any connections involving other communication endpoints (e.g., those to which the active original application does not have a handle) directly to the active replacement application. Additionally, the orchestrator entity or other resource(s) of an implementing computing system may direct reconnection attempts and/or data associated with such attempts for communication endpoints to which the active original application previously held handles, directly to the active replacement application, such that the active original application can only have constant or fewer open handles and/or connections over time.

At step 514, when the active original application no longer holds handles on any communication endpoints, an entity, such as an orchestrator entity and/or resource(s) of the implementing computing system, may terminate and/or remove (e.g., the copied binary) the active original application, in accordance with techniques similar to that described above in connection with at least FIG. 4.

Figure 6:
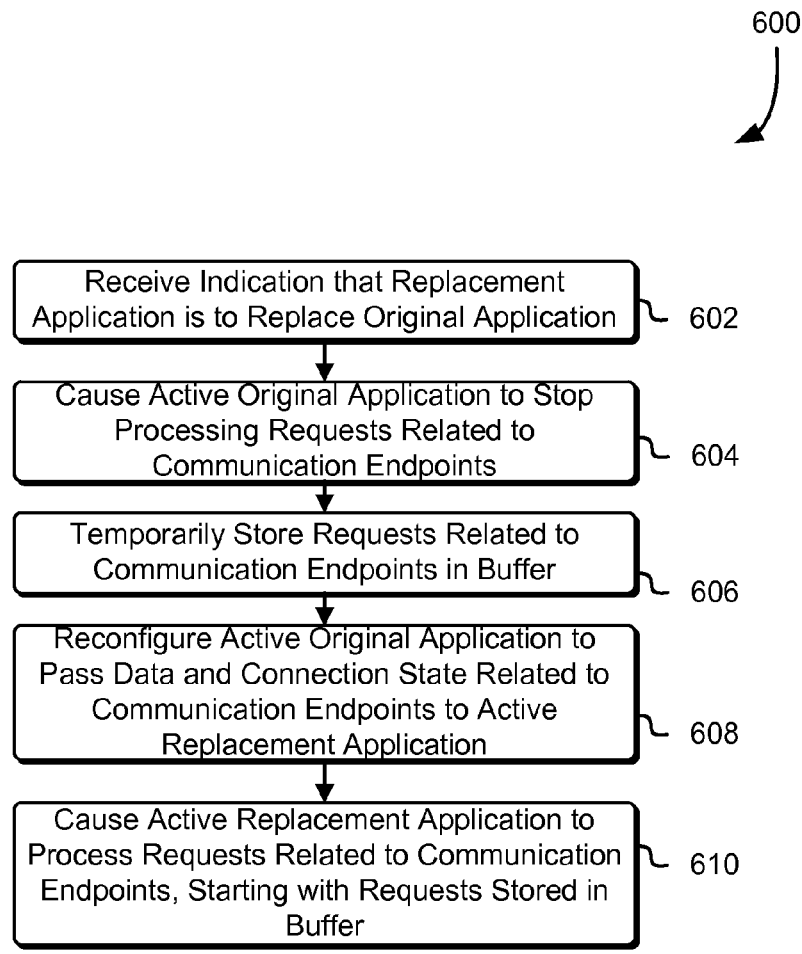
FIG. 6 schematically illustrates an example process for configuring an active original application and an active replacement application to communicate with communication endpoints, in accordance with some embodiments.

FIG. 6 schematically illustrates an example process for configuring an active original application and an active replacement application to communicate with communication endpoints, in accordance with some embodiments. At step 602, an entity, such as a listener entity as described above in connection with at least FIGS. 2-3 and the process of FIG. 5, receives a notification or other information indicating that a replacement application is to replace an active original application. In response, at step 604, an entity, such as an orchestrator entity as described above in connection with at least FIG. 3, initiates a transition between the active original application and the soon to be active replacement application by causing the active original application to suspend processing of requests related to communication endpoints to which it has a handle.

At step 606, an entity, such as the orchestrator entity, causes one or more resources of the computing system to temporarily store and/or queue requests related to the communication endpoints to which the active original application has handle while the transition described in this process 600 is underway. As previously discussed, the requests, and/or data associated therewith, may be stored in a buffer provided by or at least associated with the computing system implementing the techniques herein.

At step 608, an entity, such as the orchestrator entity, captures connection and/or processing state of the active original application in a fashion similar to that described above in connection with at least FIGS. 1-5, and further configures the active original application to act as a proxy for the aforementioned communication endpoints. Thereafter, at step 610, an entity, such as the orchestrator entity, configures the active replacement application to interface with the active original application to communication via the aforementioned communication endpoints, and further causes the implementing computing system to resume data flow so as to cause the active replacement application to take over processing from the point at which the active original application was suspended at 604. As part of this transition, at step 610, the requests and/or data stored, queued, and/or buffered by, e.g., the aforementioned buffer, may be processed in a predetermined order by the active replacement application.

Figure 7:
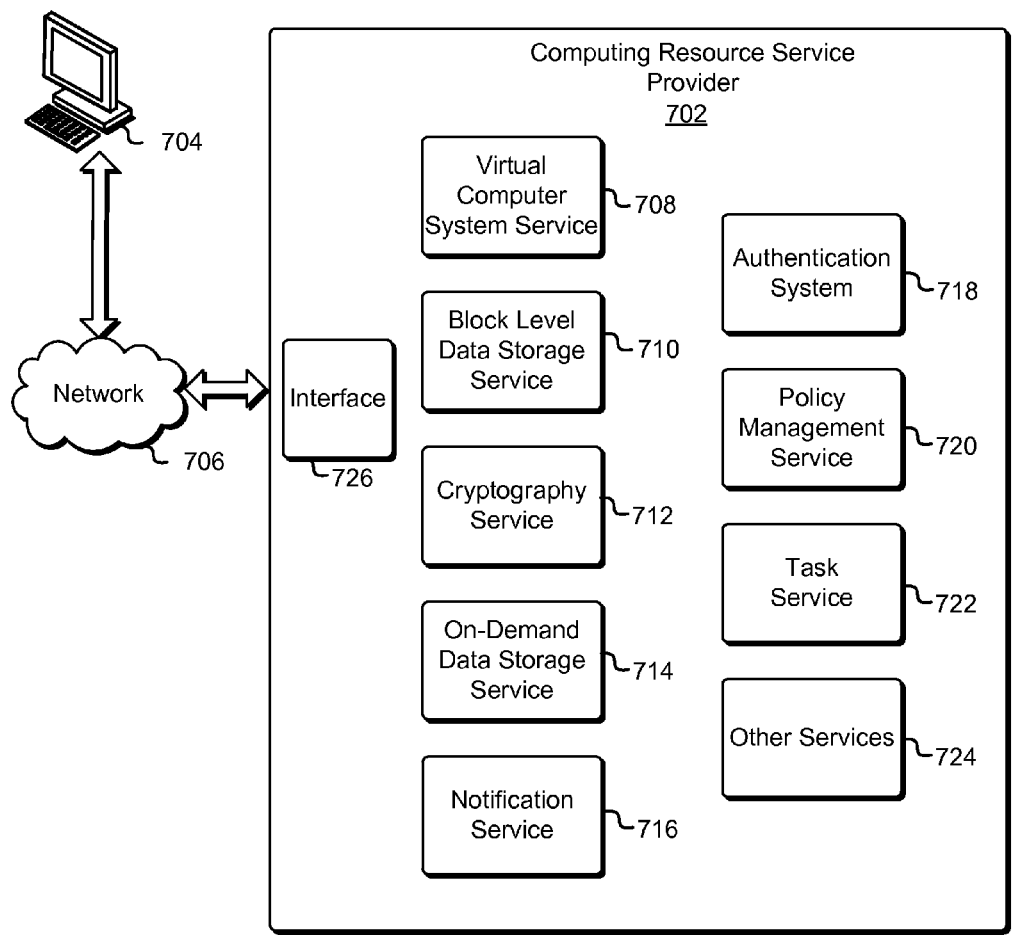
FIG. 7 schematically illustrates an example of a customer connected to a computing resource service provider in accordance with some embodiments.

FIG. 7 shows an example of a customer connected to a computing resource service provider in accordance with at least one embodiment. The computing resource service provider 702 may provide a variety of services to the customer 704 and the customer 704 may communicate with the computing resource service provider 702 via an interface 726, which may be a web services interface or any other type of customer interface. While FIG. 7 shows one interface 726 for the services of the computing resource service provider 702, each service may have its own interface and, generally, subsets of the services may have corresponding interfaces in addition to or as an alternative to the interface 726. The customer 704 may be an organization that may utilize one or more of the services provided by the computing resource service provider 702 to maintain and deliver information to its employees, which may be located in various geographical locations. Additionally, the customer 704 may be an individual that utilizes the services of the computing resource service provider 702 to deliver content to a working group located remotely. As shown in FIG. 7, the customer 704 may communicate with the computing resource service provider 702 through a network 706, whereby the network 706 may be a communication network, such as the Internet, an intranet or an Internet service provider (ISP) network. Some communications from the customer 704 to the computing resource service provider 702 may cause the computing resource service provider 702 to operate in accordance with one or more embodiments described or a variation thereof.

The computing resource service provider 702 may provide various computing resource services to its customers. The services provided by the computing resource service provider 702, in this example, include a virtual computer system service 708, a block-level data storage service 710, a cryptography service 712, an on-demand data storage service 714, a notification service 716, an authentication system 718, a policy management service 720, a task service 722 and one or more other services 724. It is noted that not all embodiments described include the services 708-724 described with reference to FIG. 7 and additional services may be provided in addition to or as an alternative to services explicitly described. As described, each of the services 708-724 may include one or more web service interfaces that enable the customer 704 to submit appropriately configured API calls to the various services through web service requests. In addition, each of the services may include one or more service interfaces that enable the services to access each other (e.g., to enable a virtual computer system of the virtual computer system service 708 to store data in or retrieve data from the on-demand data storage service 714 and/or to access one or more block-level data storage devices provided by the block level data storage service 710).

The virtual computer system service 708 may be a collection of computing resources configured to instantiate virtual machine instances on behalf of the customer 704. The customer 704 may interact with the virtual computer system service 708 (via appropriately configured and authenticated API calls) to provision and operate virtual computer systems that are instantiated on physical computing devices hosted and operated by the computing resource service provider 702. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 708 is shown in FIG. 7, any other computer system or computer system service may be utilized in the computing resource service provider 702, such as a computer system or computer system service that does not employ virtualization or instantiation and instead provisions computing resources on dedicated or shared computers/servers and/or other physical devices.

The block-level data storage service 710 may comprise one or more computing resources that collectively operate to store data for a customer 704 using block-level storage devices (and/or virtualizations thereof). The block-level storage devices of the block-level data storage service 710 may, for instance, be operationally attached to virtual computer systems provided by the virtual computer system service 708 to serve as logical units (e.g., virtual drives) for the computer systems. A block-level storage device may enable the persistent storage of data used/generated by a corresponding virtual computer system where the virtual computer system service 708 may only provide ephemeral data storage.

The computing resource service provider 702 also includes a cryptography service 712. The cryptography service 712 may utilize one or more storage services of the computing resource service provider 702 to store keys of the customers in encrypted form, whereby the keys may be usable to decrypt customer 712 keys accessible only to particular devices of the cryptography service 712.

The computing resource service provider 702 further includes an on-demand data storage service 714. The on-demand data storage service 714 may be a collection of computing resources configured to synchronously process requests to store and/or access data. The on-demand data storage service 714 may operate using computing resources (e.g., databases) that enable the on-demand data storage service 714 to locate and retrieve data quickly, to allow data to be provided in responses to requests for the data. For example, the on-demand data storage service 714 may maintain stored data in a manner such that, when a request for a data object is retrieved, the data object can be provided (or streaming of the data object can be initiated) in a response to the request. As noted, data stored in the on-demand data storage service 714 may be organized into data objects. The data objects may have arbitrary sizes except, perhaps, for certain constraints on size. Thus, the on-demand data storage service 714 may store numerous data objects of varying sizes. The on-demand data storage service 714 may operate as a key value store that associates data objects with identifiers of the data objects that may be used by the customer 704 to retrieve or perform other operations in connection with the data objects stored by the on-demand data storage service 714.

In the environment illustrated in FIG. 7, a notification service 716 is included. The notification service 716 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 716 may provide notifications to clients using a "push" mechanism without the need to check periodically or "poll" for new information and updates. The notification service 716 may further be used for various purposes such as monitoring applications executing in the virtual computer system service 708, workflow systems, time-sensitive information updates, mobile applications, and many others.

As illustrated in FIG. 7, the computing resource service provider 702, in various embodiments, includes an authentication system 718 and a policy management service 720. The authentication system 718, in an embodiment, is a computer system (i.e., collection of computing resources) configured to perform operations involved in authentication of users of the customer. For instance, one of the services 708-716 and 720-724 may provide information from a user to the authentication system 718 to receive information in return that indicates whether the user requests are authentic.

The policy management service 720, in an embodiment, is a computer system configured to manage policies on behalf of customers (such as customer 704) of the computing resource service provider 702. The policy management service 720 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 702, in various embodiments, is also equipped with a task service 722. The task service 722 is configured to receive a task package from the customer 704 and enable executing tasks as dictated by the task package. The task service 722 may be configured to use any resource of the computing resource service provider 702, such as one or more instantiated virtual machines or virtual hosts, for executing the task. The task service 724 may configure the one or more instantiated virtual machines or virtual hosts to operate using a selected operating system and/or a selected execution application in accordance with a requirement of the customer 704.

The computing resource service provider 702 additionally maintains one or more other services 724 based at least in part on the needs of its customers 704. For instance, the computing resource service provider 702 may maintain a database service for its customers 704. A database service may be a collection of computing resources that collectively operate to run one or more databases for one or more customers 704. The customer 704 may operate and manage a database from the database service by utilizing appropriately configured API calls. This, in turn, may allow a customer 704 to maintain and potentially scale the operations in the database. Other services include, but are not limited to, object-level archival data storage services, services that manage and/or monitor other services.

As used, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests, and/or other such requests from other services within the computer system.

Figure 8:
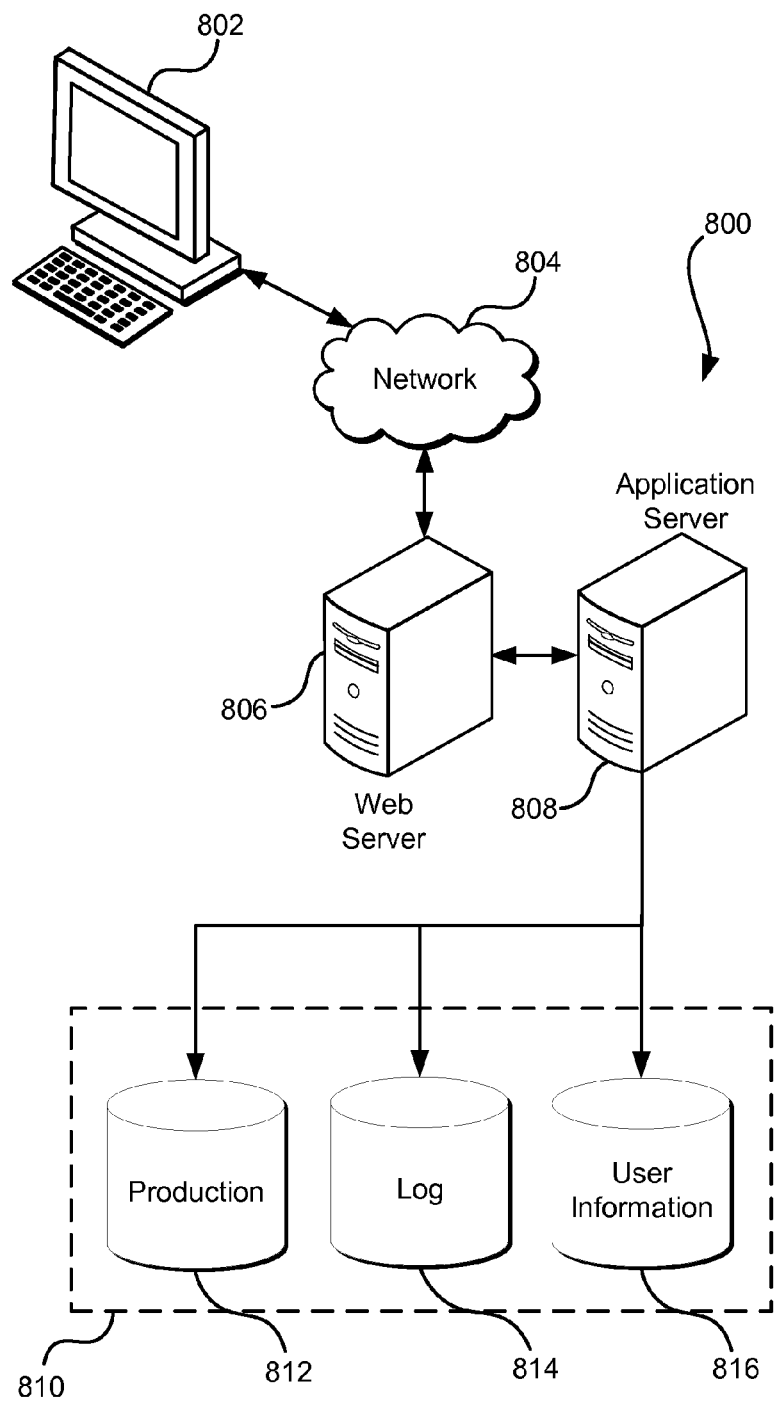
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    initializing an original application at a first location monitored by a listener by at least:
        copying binary code of the original application to a second location, thereby generating a copy of the original application; and
        activating the copy of the original application to respond to activity at one or more communication endpoints and hold handles to the one or more communication endpoints to which the activity relates, thereby creating an active original application;

at a time after the listener detects that the original application has been replaced by a replacement application at the first location, at least:
  copying binary code of the replacement application to a third location, thereby generating an active replacement application;
  capturing a state of the active original application including information identifying the one or more communication endpoints to which the active original application has handles;
  transferring the state corresponding to the handles to the active replacement application;
  configuring the active original application to pass, to the active replacement application, further activity at the one or more communication endpoints to which the handles are held;
  configuring the active replacement application to interface with the active original application to access the one or more communication endpoints to which the handles are held; and
  removing the active original application after handles on the one or more communication endpoints are no longer held.

2. The computer-implemented method of claim 1, wherein the state is transferred in response to a notification generated by the active replacement application and provided to the active original application.

3. The computer-implemented method of claim 1, further comprising causing the active replacement application to respond, outside of the active original application, to activity at communication endpoints that differ from those to which the handle is held.

4. The computer-implemented method of claim 1, further comprising, when connection between the active original application and a subset of the one or more communication endpoints is broken, directing reconnections of the subset to the active replacement application.

5. A system, comprising:
  one or more processors; and
  memory that includes instructions that, as a result of being executed by the one or more processors, cause the system to:
    monitor a location for changes related to an active original application that communicates via one or more communication endpoints; and
    at a time after detecting that a replacement application exists at the monitored location, at least:
    capture a subset of a state of the active original application including information identifying the one or more communication endpoints to which the active original application has handles;
    transfer the state corresponding to the handles to an active version of the replacement application;
    cause the active replacement application to interface with the active original application to communicate with the one or more communication endpoints; and
    remove the active original application after handles on the one or more communication endpoints are no longer held.

6. The system of claim 5, wherein the memory further includes instructions that, as a result of being executed by the one or more processors, cause the system to cause the active replacement application to communicate with other communication endpoints that differ from the one or more communication endpoints.

7. The system of claim 5, wherein the memory further includes instructions that, as a result of being executed by the one or more processors, cause the system to, if the active replacement application is incapable of interfacing with the active original application to communicate with a subset of the one or more communication end points, cause the active replacement application to communicate with the subset of the one or more communication endpoints outside of the active original application.

8. The system of claim 7, wherein the memory further includes instructions that, as a result of being executed by the one or more processors, cause the system to, at a time after determining that the active replacement application is incapable of interfacing with the active original application to communicate with the one or more communication endpoints, terminate the active original application.

9. The system of claim 5, wherein the location stores a copy of an executable binary for the active original application.

10. The system of claim 5, wherein the location is on a different device than the active original application.

11. The system of claim 5, wherein the replacement application is a different version of the active original application.

12. The system of claim 5, wherein the active original application is located on a different device than the active replacement application.

13. A non-transitory computer-readable storage medium having stored thereon executable instructions that, as a result of being executed by one or more processors of a computer system, cause the computer system to at least:
  at a time after being notified of a pending update to an active original application that communicates via one or more communication endpoints to which the active original application has handles, at least:
    reroute communications between the active original application and the one or more communication endpoints to a buffer;
    cache requests, in the buffer, related to the one or more communication endpoints;
    transfer at least a portion of a task state corresponding to the handles of the active original application to an active replacement application;
    configure the active replacement application to interface with the active original application to communicate with the one or more communication endpoints to which the handles are held;
    reroute the communications to the active replacement application, by at least causing the active replacement application to process the cached requests; and
    remove the active original application after handles on the one or more communication endpoints are no longer held.

14. The non-transitory computer-readable storage medium of claim 13, wherein the instructions further comprise instructions that, wherein the computer system is notified by a listener that monitors a location for the update.

15. The non-transitory computer-readable storage medium of claim 13, wherein the instructions further comprise instructions that, when executed by the one or more processors, cause the computer system to transfer the task state by transferring the cached requests to the active replacement application.

16. The non-transitory computer-readable storage medium of claim 13, wherein the one or more communication endpoints include network sockets.

17. The non-transitory computer-readable storage medium of claim 13, wherein the instructions further comprise instructions that, when executed by the one or more processors, cause the computer system to configure the active replacement application to interface directly with a subset of the one or more communication endpoints if the active original application is unable to communicate with the subset.

18. The non-transitory computer-readable storage medium of claim 13, wherein the instructions further comprise instructions that, when executed by the one or more processors, cause the computer system to terminate the active original application if none of the one or more communication endpoints are in communication with the active original application.

19. The non-transitory computer-readable storage medium of claim 13, wherein the active original application is an application made available by a service provided by a computing resource service provider associated with the computer system.

20. The non-transitory computer-readable storage medium of claim 19, wherein the service is made available by an application programming interface provided by the computing resource service provider.

\* \* \* \* \*